Patented Jan. 2, 1945

2,366,452

UNITED STATES PATENT OFFICE 2,366,452

PROCESS OF PREPARING CONDENSATION PRODUCTS

Ludwig Mack, Frankfort-on-the-Main-Unterliederbach, Germany, assignor to General Aniline & Film Corporation, New York, N. Y., a corporation of Delaware No Drawing. Application July 13, 1940, Serial No. 345,378. In Germany August 2, 1939

7 Claims. (Cl. 260—401)

The present invention relates to a process of preparing condensation products.

Valuable condensation products are obtained by causing carboxylic acid amides to react with aldehyde bisulfite compounds or ketone bisulfite compounds at a raised temperature. If fatty acid amides and formaldehyde take part in the reaction, amino methane sulfonic acids substituted at the nitrogen atom by a fatty acid radical are obtained in the form of salts. The salts are distinguished by high interface modifying properties and dissolve in water to completely clear and colorless solutions. The reaction may require several hours until it is complete.

Now I have found that amino sulfonic acids substituted in the amino group by an acyl radical may be obtained by condensing carboxylic acid amides with a formaldehyde bisulfite compound, the reaction being performed in the presence of a compound selected from the group consisting of aliphatic, cycloaliphatic and araliphatic secondary amines, condensation products of the said amines capable of yielding amines by splitting up, and the salts of the said compounds. In the presence of the amino compounds the time of reaction is considerably shortened.

The reaction involved proceeds according to the following equation:

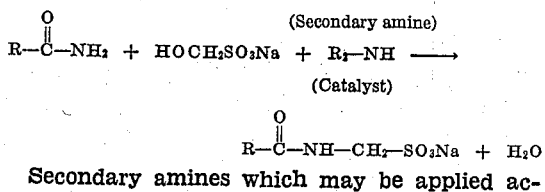

Secondary amines which may be applied according to the present invention are for instance piperidine, diethyl-amine, diisoamyl-amine, diethylol-amine, piperazine, dimethyl-amine, dibutyl-amine, diisobutyl-amine, dicyclohexyl-amine, dioctylamine, di-alpha-ethyl-hexylamine, methyl-ethylamine, butyl-dodecylamine, cyclohexyl-methylamine, morpholine, bis-hydroxyethoxyethylamine, benzylmethylamine, dibenzylamine, phenoxyethyl-methylamine. As condensation products of these amines which may be split up again to form the amines there may be named: dipiperidine - methane, dipiperidinoethane, tetraethyl - methylenediamine. Compounds of said kind are for instance produced by the reaction of 2 mols of a secondary amine as it is for instance named above, with 1 mol of formaldehyde or with formaldehyde-sodiumbisulfite. From diethylamine and formaldehyde-sodiumbisulfite there is for instance formed diethylamino-methanesulfonic acid as sodium salt (see "Berichte der Deutschen Chemischen Gesellschaft," vol. 37, 1904, pages 4087 et seq.). From said compound formaldehyde and sulfurous acid are readily split off and tetraethyl-methylenediamine is formed. Since according to the present invention formaldehyde-sodium-bisulfite may be used as reaction component besides the carboxylic acid amides, condensation products may be formed if the secondary amines in question are simultaneously used. It is already known that condensation products, for instance dipiperidinomethane may readily be split with re-formation of the secondary amine.

Among the salts of the secondary amines or the condensation products thereof, there may, for instance, be named their hydrochlorides or acetates.

The quantities required according to the present invention are in general so small that reactions of equivalent quantities do not take place, but that a catalytic effect is attained. Rapid, excellent reactions are produced for instance with 0.07 mol of piperidine on 1 mol of formaldehyde-sodium-bisulfite. Larger quantities than those named may, however, also be used.

Any desired carboxylic acids may be used and especially those containing at least 6 carbon atoms.

As amides which are suitable for carrying out the present process there may be named the amides of the following aliphatic acids: caproic acid, alpha-ethylhexylic acid, capric acid, lauric acid, myristic acid, palmitic acid, stearic acid, undecylenic acid, oleic acid, 9.10-dichlorostearic acid, ricinoleic acid. Instead of these pure acids there may be used commercial mixtures, for instance coconut oil fatty acid, palmkernel oil fatty acid, palm oil fatty acid, soy bean oil fatty acid, linoleic oil fatty acid, train oil fatty acid, hardened soy bean fatty acids and train oil fatty acids, carboxylic acids obtained during the oxidation of paraffines, for instance fractions chiefly containing carboxylic acids with 7 to 9 carbon atoms, or fractions chiefly containing so-called soap-fatty acids, i. e. carboxylic acids having 12–18 carbon atoms. There may furthermore be used the amides of aliphatic-aromatic acids, such as para-isooctylbenzoic acid, isooctylphenoxy-acetic acid, dodecylphenoxy-acetic acid, diisobutyl-benzoic acid, triisobutylphenyl-acetic acid, triisobutylhydro-cinnamic acid, para-butylcyclohexyl - γ - butyric acid, dodecylhydroxyacetic acid, octadecyl-mercapto-propionic acid and finally compounds, such as myristylsarcoside, succinic acid-mono-dodecylamide, isooctyl-hydroxyacetic acid amide, tetradecylbenzoic acid amide, hexadecyl-para-chlorobenzoic acid amide, diglycolic acid-mono-(para-dodecyl)-anilide as well as the amides of N-dodecyl-N-methylamino-acetic acid and of para-(octylsulfonyl)-amino-benzoic acid, montanic acids, naphthenic acids and resin acids as well as the hydrogenation product thereof.

The following examples serve to illustrate the invention, but they are not intended to limit it thereto, the parts being by weight:

(1) 1 part of oleic acid amide and 1 part of commercial formaldehyde-sodium-bisulfite are mixed with 2.4 parts of sodium sulfate and 0.04 part of piperidine. The mixture is introduced into a boiler made of steel which is resistant to the action of alkali and acids and provided with a good stirring device. The temperature is raised within a short time from 140° C. to 210° C. by heating the mixture on an oil bath. Already after about 40 minutes the sodium salt of the aminomethane sulfonic acid substituted at the nitrogen by the acyl radical of the oleic acid is produced in the form of a yellowish powder which dissolves in water to a completely clear and colorless solution. For the manufacture of the product without the addition of piperidine several hours are required.

Instead of piperidine, dipiperidinomethane may be added to the reaction mixture, it being recommendable slightly to increase the quantity to be used.

(2) 1 part of oleic acid amide, 1 part of commercial formaldehyde-sodium-bisulfite and 0.04 part of the hydrochloride of diethylamine are heated in a stirring vessel on an oil bath to a temperature of the oil bath of 186° C. After an hour's reaction the sodium salt of oleic acid-aminomethane-sulfonic acid has been formed.

Instead of the hydrochloride of diethylamine there may be added to the reaction mixture tetra-ethylmethylene-diamine which is readily formed from the sodium salt of diethyl-aminomethane-sulfurous acid produced from diethylamine and formaldehyde-bisulfite (see "Berichte der Deutschen Chemischen Gesellschaft," vol. 37, pages 4087 et seq.).

(3) In an oil bath slowly heated to 189° C. there is operated, while stirring, as follows: A mixture of 750 parts of commercial formaldehyde-sodium-bisulfite and 12.1 parts of dicyclohexylamine is introduced into a melt of 750 parts of oleic acid amide. A nearly complete dissolution occurs. The reaction is then carried through within 65 minutes. 1269 parts of a condensation product are obtained which is soluble in water to a clear solution.

(4) 750 parts of an acid amide obtained from sperm oil are heated, while stirring, with a mixture of 800 parts of commercial formaldehyde-sodium-bisulfite and 8.6 parts of diisobutyl amine. Complete liquefaction soon sets in. The temperature of the oil bath is then raised within the course of 1 hour from 140° C. to 173° C., while the reaction at the same time yields, while foaming, 1190 parts of a product which dissolves in water to a clear solution.

I claim:

1. The process of preparing amino sulfonic acids substituted in the amino group by an acyl radical which comprises condensing carboxylic acid amides with a formaldehyde bisulfite compound, the reaction being performed in the presence of a compound acting as a catalyst to accelerate the condensation selected from the group consisting of aliphatic, cycloaliphatic and araliphatic secondary amines, condensation products of the said amines capable of yielding amines by splitting up, and the salts of the said compounds.

2. The process of preparing amino sulfonic acids substituted in the amino group by an acyl radical which comprises condensing carboxylic acid amides having at least 6 carbon atoms with a formaldehyde bisulfite compound, the reaction being performed in the presence of a compound acting as a catalyst to accelerate the condensation selected from the group consisting of aliphatic, cycloaliphatic and araliphatic secondary amines, condensation products of the said amines capable of yielding amines by splitting up, and the salts of the said compounds.

3. The process of preparing amino sulfonic acids substituted in the amino group by an acyl radical which comprises condensing carboxylic acid amides having at least 6 carbon atoms with a formaldehyde bisulfite compound, the reaction being performed in the presence of a small quantity of piperidine as a catalyst which accelerates the reaction.

4. The process of preparing amino sulfonic acids substituted in the amino group by an acyl radical which comprises condensing carboxylic acid amides having at least 6 carbon atoms with a formaldehyde bisulfite compound, the reaction being performed in the presence of a small quantity of dicyclohexylamine as a catalyst which accelerates the reaction.

5. The process of preparing amino sulfonic acids substituted in the amino group by an acyl radical which comprises condensing carboxylic acid amides having at least 6 carbon atoms with a formaldehyde bisulfite compound, the reaction being performed in the presence of a small quantity of diisobutylamine as a catalyst which accelerates the reaction.

6. The process according to claim 1 in which the carboxylic acid amide is oleic acid amide.

7. The process according to claim 1 in which the condensation reaction is conducted at a temperature ranging from about 140° to 210° C.

LUDWIG MACK.